W. MORTON.
FRUIT-BUCKETS.

No. 182,217. Patented Sept. 12, 1876.

Witnesses:
S. G. Tubbs
O. Morton

Inventor:
Wm Morton

N. PETERS, PHOTO-LITHOGRAPHER, WASHINGTON, D. C.

UNITED STATES PATENT OFFICE.

WILLIAM MORTON, OF WOODHULL, ASSIGNOR OF FOUR-FIFTHS OF HIS RIGHT TO SILAS G. TUBBS AND S. L. WILDRICK, OF WOODHULL, AND HENRY BALDWIN AND L. G. LAIN, OF ADDISON, NEW YORK.

IMPROVEMENT IN FRUIT-BUCKETS.

Specification forming part of Letters Patent No. 182,217, dated September 12, 1876; application filed July 17, 1876.

*To all whom it may concern:*

Be it known that I, WILLIAM MORTON, of Woodhull, in the county of Steuben and State of New York, have invented certain new and useful Improvements in Fruit-Buckets; and I do hereby declare the following to be a full, clear, and exact description thereof, reference being had to the accompanying drawing, and to the letters of reference marked thereon.

The nature of my invention consists in the construction and arrangement of a fruit-bucket, as will be hereinafter more fully set forth.

In order to enable others skilled in the art to which my invention appertains to make and use the same, I will now proceed to describe its construction and operation, referring to the annexed drawing, which forms a part of this specification, and in which—

Figure 1:
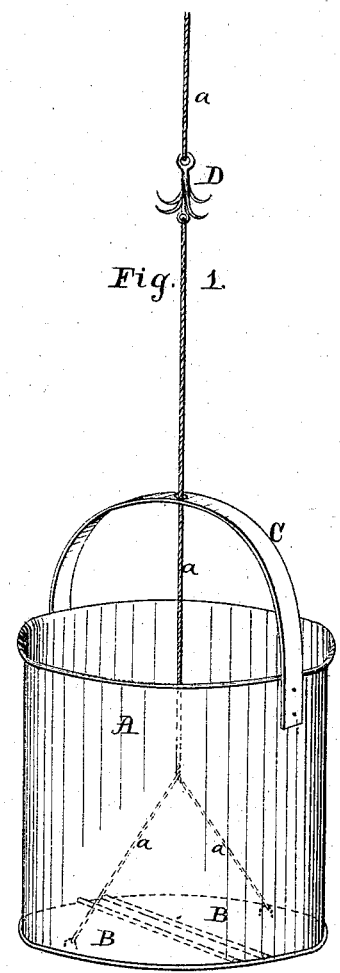
Figure 2:
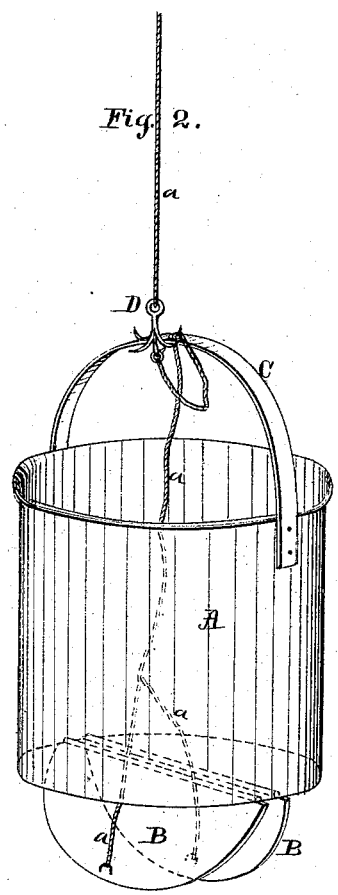

Figure 1 is a perspective view of my fruit-bucket, showing the bottom of the same closed. Fig. 2 is a similar view thereof, showing the bottom open.

A represents the bucket, constructed in cylindrical form, and of any suitable material, and provided with a bail, C, rigidly attached to the bucket. The bottom of the bucket is formed of two semicircular plates, B, pivoted across the center of the bucket, and opening downward. *a* is a cord or rope passing through a hole in the center of the stationary bail C, which thus acts as a guide for said cord. The lower end of the cord *a* is divided in two parts, and attached to the plates B, near their outer edges. To the cord *a* is attached a pronged reversible grapple, D, as shown. This grapple may be used over a limb or branch of the tree to suspend the bucket, and it may be used in hoisting the bucket after it has been lowered and emptied.

The device is very simple in construction, cheap, and durable, and not liable to get out of order.

By the cord passing through the central hole in the stationary bail C, it cannot get twisted or in any way entangled.

Having thus fully described my invention, what I claim as new, and desire to secure by Letters Patent, is—

The combination of the bucket A, stationary bail C, the centrally-pivoted bottom plates B B, the cord *a*, attached to said plates, and passing through a hole in the bail, and the pronged reversible grapple D, all constructed substantially as and for the purposes herein set forth.

WM. MORTON.

Witnesses:
S. G. TUBBS,
O. MORTON.